United States Patent [19]

Altermatt

[11] Patent Number: 4,772,725
[45] Date of Patent: Sep. 20, 1988

[54] ANTHRIMIDECARBAZOLE COMPOUND HAVING THENOYLAMINO GROUPS

[75] Inventor: Hans Altermatt, Reinach, Switzerland

[73] Assignee: Ciba-Geigy Corporation, Ardsley, N.Y.

[21] Appl. No.: 139,561

[22] Filed: Dec. 30, 1987

[30] Foreign Application Priority Data

Feb. 17, 1987 [CH] Switzerland ............................. 580/87

[51] Int. Cl.$^4$ ............................................ C07D 409/02
[52] U.S. Cl. .................................................. 548/416
[58] Field of Search ......................................... 548/416

[56] References Cited

U.S. PATENT DOCUMENTS 3,483,230 12/1969 Hari et al. ............................ 548/416

*Primary Examiner*—Robert W. Ramsuer
*Attorney, Agent, or Firm*—Edward McC. Roberts; Meredith C. Findlay

[57] ABSTRACT

Novel anthrimidecarbazole compound of the formula

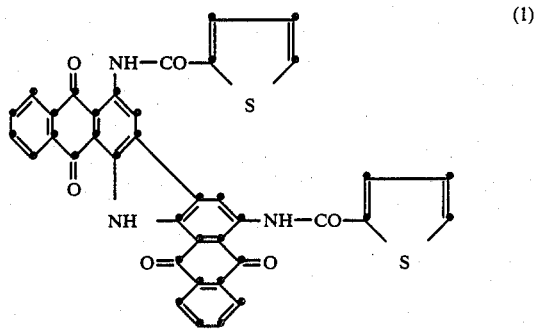

(1)

as an olive-coloring vat dye exhibiting an increased ability to reflect infra-red light.

1 Claim, No Drawings

ANTHRIMIDECARBAZOLE COMPOUND HAVING THENOYLAMINO GROUPS

The present invention relates to an anthrimidecarbazole compound having thenoylamino groups, to processes for its preparation and to its use as a vat dye for dyeing or printing textile fibres of natural or regenerated cellulose.

The anthrimidecarbazole compound according to the invention corresponds to the formula

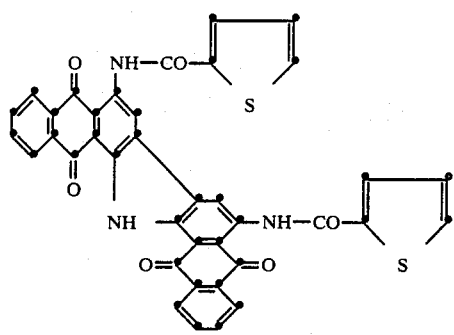
(1)

This novel olive-colouring vat dye differs from the known vat dye which imparts a similar colouring, 4,4'-dibenzoylamino-1,1'-dianthrimidecarbazole (Vat Black 27, C.I. No. 69005) in its ability to reflect infra-red light. The dye according to the invention exhibits a significantly steeper rise in the reflectance curve between 700 and 900 nm than the known dye, this being especially desirable for infra-red camouflage. This improvement in the infra-red reflectance is surprising.

The anthrimidecarbazole compound of the formula (1) is obtained by carbazolation of 4,4'-dithenoylamino-1,1'-dianthrimide of the formula

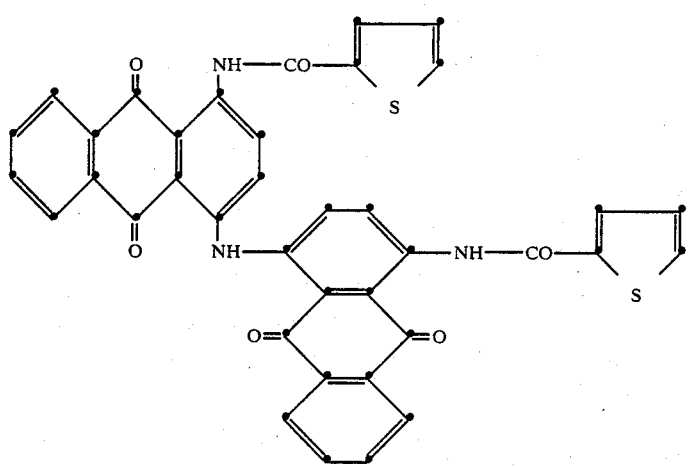
(2)

in accordance with the customary methods of carbazolation, for example in from 95 to 105% sulphuric acid or in chlorosulphonic acid at from 10° to 70° C.

The novel carbazole compound can also be prepared by introducing the thenoylamino group into the 3- and 6-positions of the 1,2,7,8-diphthaloylcarbazole. This introduction is carried out by acylating 3,6-diamino-1,2,7,8-diphthaloylcarbazole of the formula

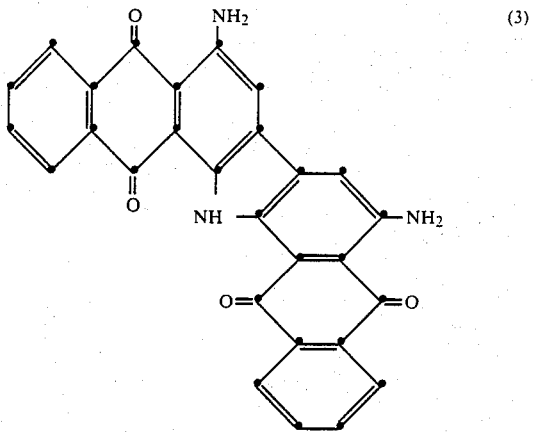
(3)

with a thiophene-2-carboxylic acid halide, especially the chloride, or by condensing a 3,6-dihalo-1,2,7,8-diphthaloylcarbazole of the formula

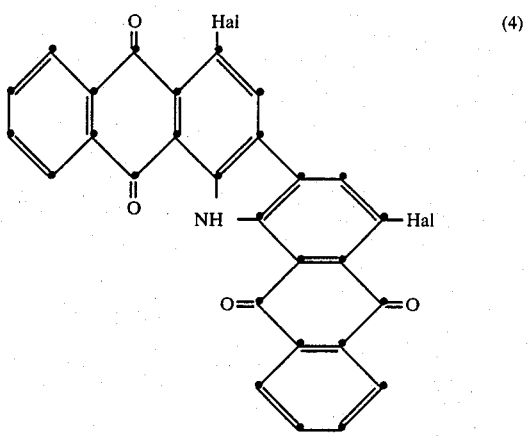
(4)

in which Hal represents bromine or chlorine, with thiophene-2-carboxylic acid amide.

The reactions take place preferably in an inert high-boiling organic solvent, for example at from 150° to 230° C. Suitable solvents are chlorobenzenes, such as dichlorobenzene or trichlorobenzene, or especially nitrobenzene.

The anthrimidecarbazole compound according to the invention is suitable for dyeing or printing a wide variety of materials, especially for dyeing or printing fibres of natural or regenerated cellulose in the presence of reducing agents, such as, for example, dithionite. Owing to its advantageous ability to reflect infra-red light, its olive shade and its good colour-fastness in use, the novel dye can be used especially for dyeing or printing military articles made of cotton.

In the following Examples, unless indicated otherwise, the parts are parts by weight and the percentages are percentages by weight.

EXAMPLE 1

8.25 g of 1-bromo-4-thenoyl-(2')-amino-anthraquinone and 7.3 g of 1-amino-4-thenoyl-(2')-amino-anthraquinone are stirred for 8 hours at 195°–200° C. in 80 ml of nitrobenzene in the presence of 2.2 g of sodium carbonate and 0.5 g of copper(I) chloride. After cooling, the product is filtered off and washed with nitrobenzene and ethanol. The product is then washed again with water and extracted by boiling with 5% nitric acid. The substance so obtained is filtered off again and washed neutral. 11.5 g of the anthrimide of the formula

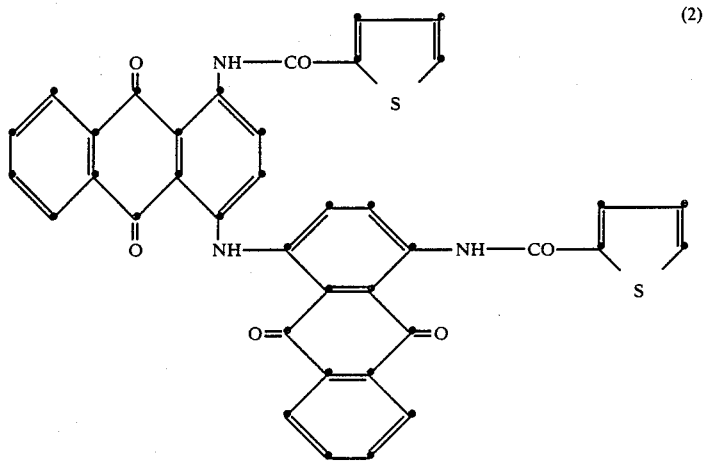

are obtained. 10 g of the anthrimide of the formula (2) are introduced into 100 g of sulphuric acid (96%) at 10°–20° C. The solution is then stirred for 3 hours at 20°–25° C. and poured onto 500 ml of ice-water containing 1 g of sodium chlorate. The resulting suspension is heated to 70° C. A solution of 1 g of sodium chlorate in 10 ml of water is then added dropwise over a period of 20 minutes. The reaction suspension is stirred for 2 hours at 90° C. and the product is filtered off while hot and washed until neutral. After drying, 9.8 g of the dye of the formula

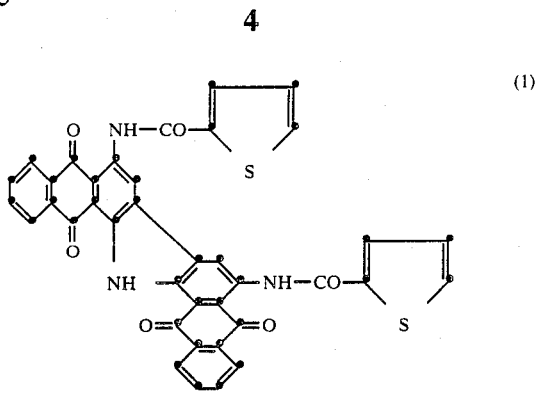

are obtained. This dye colours cotton from the vat in fast, olive shades.

A 1.6% dyeing on cotton cretonne exhibits at

| 700 nm | 31%, |
| 800 nm | 64% and |
| 900 nm | 71% infra-red (IR) reflectance. |

The comparison dye CI Vat Black 27, C.I. 69005, which contains benzoylamino groups instead of thenoylamino groups, exhibits, at the same dyeing strength, at

| 700 nm | 28%, |
| 800 nm | 40% and |
| 900 nm | 59% IR reflectance. |

EXAMPLE 2

9.2 g of 4,4'-diamino-1,1'-dianthrimide are heated in 75 ml of nitrobenzene to 145°–150° C. 6.5 g of thiophene-2-carboxylic acid chloride are then added dropwise over a period of 30 minutes. The temperature of the suspension is increased to 170°–175° C. over a period of 2 hours and the suspension is stirred for 2 hours at that temperature. After cooling, the product is filtered off and washed with nitrobenzene and ethanol. 12.5 g of the anthrimide of the formula (2) are obtained. The anthrimide is converted into the carbazole compound of the formula (1) in accordance with Example 1, paragraph 2.

EXAMPLE 3

9.2 g of 3,6-diamino-1,2,7,8-diphthaloylcarbazole of the formula (3) are heated in 100 ml of nitrobenzene to 145°–150° C. 7.5 g of thiophene-2-carboxylic acid chloride are added dropwise over a period of 30 minutes. The temperature is increased to 185°–190° C. over a period of 3 hours and then the reaction mixture is stirred for 5 hours. After cooling, the precipitate is filtered off, washed thoroughly with nitrobenzene and ethanol and dried. The product obtained corresponds to the dye of the formula (1) prepared in accordance with Example 1.

DYEING INSTRUCTIONS 1.5 g of the dye of formula (1) are vatted at from 50° to 60° C. with 15 ml of a sodium hydroxide solution of 36° Bé and 5 g of sodium dithionite in 200 g of water. The above stock vat is added to a dye bath containing, in 2000 g of water, 5 ml of the sodium hydroxide solution and 3.7 g of sodium dithionite, and then the dyeing operation is initiated at 50° C. with 100 g of cotton. After 10 minutes, 15 g of sodium chloride are added and after 20 minutes a further 15 g are added and dyeing is carried out at 50° C. for 45 minutes. The cotton is then squeezed out, oxidised and finished in the customary manner. A fast olive dyeing is obtained.

What is claimed is:

1. The anthrimidecarbazole compound of the formula

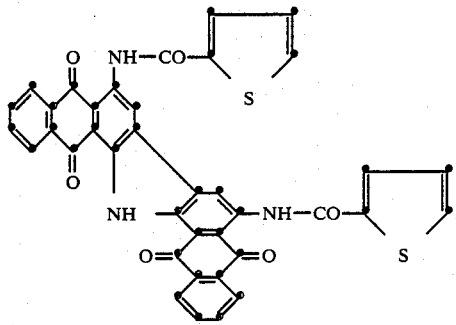

* * * * *